(12) United States Patent
Qu et al.

(10) Patent No.: US 9,430,979 B2
(45) Date of Patent: Aug. 30, 2016

(54) LIQUID CRYSTAL DISPLAY PANEL, METHOD FOR DRIVING THE SAME AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Yingying Qu, Beijing (CN); Honglin Zhang, Beijing (CN); Dan Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 41 days.

(21) Appl. No.: 14/367,683
(22) PCT Filed: Dec. 11, 2013
(86) PCT No.: PCT/CN2013/089120
§ 371 (c)(1),
(2) Date: Jun. 20, 2014
(87) PCT Pub. No.: WO2015/032144
PCT Pub. Date: Mar. 12, 2015

(65) Prior Publication Data
US 2015/0070336 A1 Mar. 12, 2015

(30) Foreign Application Priority Data

Sep. 6, 2013 (CN) .......................... 2013 1 0404289

(51) Int. Cl.
*G09G 3/36* (2006.01)
*G02F 1/1343* (2006.01)

(52) U.S. Cl.
CPC ....... *G09G 3/3648* (2013.01); *G02F 1/134309* (2013.01); *G09G 3/36* (2013.01);
(Continued)

(58) Field of Classification Search
CPC .................. G09G 3/36; G09G 3/3648; G09G 2300/0809; G09G 2340/00; G09G 2300/0421; G09G 2300/0426; G09G 2300/0434; G02F 1/133; G02F 1/1335; G02F 1/1337; G02F 1/1343; G02F 1/134309; G02F 2001/134381; C09K 19/02; C09K 19/20; C09K 19/34
See application file for complete search history.

(56) References Cited

U.S. PATENT DOCUMENTS

2004/0109121 A1   6/2004   Cho et al.
2008/0129901 A1*  6/2008   You ..................... G02F 1/13718
                                                    349/33
(Continued)

FOREIGN PATENT DOCUMENTS

CN   1949064 A    4/2007
CN   101750821 A  6/2010
(Continued)

OTHER PUBLICATIONS

International Search Report for International Application No. PCT/CN2013/089120 issued Jun. 25, 2014, 15pgs.
Second Chinese Office Action dated Nov. 4, 2015; Appln. No. 201310404289.9.
First Chinese Office Action Appln. No. 201310404289.9; Dated Jun. 2, 2015.

(Continued)

*Primary Examiner* — Lun-Yi Lao
*Assistant Examiner* — Johny Lau
(74) *Attorney, Agent, or Firm* — Ladas & Parry LLP

(57) ABSTRACT

Embodiments of the invention disclose a liquid crystal display panel, a method for driving the same, and a display device, to improve the transmissivity and the image display quality of the LCD panel. The LCD panel comprises a first substrate and a second substrate disposed opposite to each other, and a liquid crystal layer positioned between the first substrate and the second substrate; a first electrode and a second electrode insulated from and disposed on the first electrode are disposed on a side of the first substrate which is close to the liquid crystal layer; one of the first electrode and the second electrode is a common electrode, the other is a pixel electrode; a third electrode and a fourth electrode are disposed on a side of the second substrate which is close to the liquid crystal layer, one of the third electrode and the fourth electrode is a common electrode, and the other is a pixel electrode.

17 Claims, 7 Drawing Sheets

(52) U.S. Cl.
CPC ............ *G02F2001/134381* (2013.01); *G09G 2300/0421* (2013.01); *G09G 2300/0426* (2013.01); *G09G 2300/0434* (2013.01); *G09G 2300/0809* (2013.01); *G09G 2340/00* (2013.01)

(56) References Cited

U.S. PATENT DOCUMENTS

| | | | |
|---|---|---|---|
| 2010/0134710 A1 | 6/2010 | Ishitani et al. | |
| 2011/0075074 A1* | 3/2011 | Gauza | C09K 19/0275 349/96 |
| 2013/0258255 A1* | 10/2013 | Fang | G02F 1/134363 349/96 |

FOREIGN PATENT DOCUMENTS

| | | |
|---|---|---|
| CN | 102031121 A | 4/2011 |
| CN | 102866546 A | 1/2013 |
| CN | 102879957 A | 1/2013 |
| CN | 203480174 U | 3/2014 |
| JP | 2010066645 A | 3/2010 |

OTHER PUBLICATIONS

International Preliminary Report on Patentability issued Mar. 8, 2016; PCT/CN2013/089120.

Third Chinese Office Action dated Apr. 21, 2016; Appln. No. 201310404289.9.

* cited by examiner

LIQUID CRYSTAL DISPLAY PANEL, METHOD FOR DRIVING THE SAME AND DISPLAY DEVICE

CROSS REFERENCE TO RELATED APPLICATIONS

This application is based on International Application No. PCT/CN2013/089120 filed on Dec. 11, 2013, which claims priority to Chinese National Application No. 201310404289.9 filed on Sep. 6, 2013. The entire contents of each and every foregoing application are incorporated herein by reference.

TECHNICAL FIELD

Embodiments of the present invention relate to the field of display technologies, more particularly, to a liquid crystal display panel, a method for driving the same and a display device.

BACKGROUND

Thin Film Transistor Liquid Crystal Displays (TFT-LCDs) have the features of small volume, power saving and non-radiating and takes a leading role in the current flat-panel display market. Wide viewing angle display technologies have become a popular research topic nowadays.

Wide viewing angle displays are classified into the In-Plane Switching (IPS) type and the Advanced Super Dimension Switch (ADS) type according to the display mode. The IPS mode LCDs change the azimuth angle parallel to the substrate direction of the optical axis of the liquid crystal molecules by means of the transverse electric field generated by the pixel electrode and the common electrode in the same layer, thereby controlling the transmissivity. An IPS mode LCD can increase the viewing angle of the LCD up to 170°. However, there are the disadvantages of low contrast ratio and low transmissivity. As a result, the brightness of the backlight has to be increased to realize the display of images with high brightness.

An ADS mode LCDs form a multi-dimensional electric field (E-field) with both an E-field produced at edges of slit electrodes on the same plane and an E-field produced between a slit electrode layer and a plate electrode layer, so that liquid crystal molecules at all orientations, which are located directly above the electrodes and between the slit electrodes in a liquid crystal cell, can be rotated, which enhances the work efficiency of the liquid crystals and increases light transmittance. The ADS technology can improve the picture quality of the TFT-LCDs and has the advantages of high resolution, high transmissivity, low power consumption, wide viewing angles, high aperture ratio, low chromatic aberration, no push Mura, etc. With respect to different applications, variants of the ADS technology comprise high transmissivity I-ADS technology, high aperture ratio H-ADS technology and high resolution S-ADS technology and the like.

Whether for the IPS mode LCDs or for the ADS mode LCDs, the stronger the transverse E-field in the liquid crystal layer is, the higher the transmissivity is, and the lower the voltage required for driving the liquid crystal molecules to rotate to the same angle is. Currently, the IPS or ADS mode LCDs have low transmissivity and high driving voltage, which can jeopardize the display of high quality image by the LCDs.

SUMMARY

Embodiment of the invention provides an LCD panel, a method for driving the same and a display device, with the purpose of improving the transmissivity and the image display quality of the LCD panel.

The LCD panel provided by the invention comprises: a first substrate and a second substrate disposed opposite to each other, and a liquid crystal layer positioned between the first substrate and the second substrate; a first electrode and a second electrode insulated from and disposed on the first electrode are disposed on a side of the first substrate which is close to the liquid crystal layer; one of the first electrode and the second electrode is a common electrode, and the other is a pixel electrode; a third electrode and a fourth electrode are disposed on a side of the second substrate which is close to the liquid crystal layer, one of the third electrode and the fourth electrode is a common electrode, and the other is a pixel electrode.

The first electrode and the second electrode may be insulated from each other via a first insulation layer disposed therebetween; the first electrode is a plate electrode, and the second electrode is a slit electrode.

The third electrode and the fourth electrode may be disposed in the same layer, the third electrode comprises a plurality of third strip electrodes extending along a first direction, the fourth electrode comprises a plurality of fourth strip electrodes extending along the first direction, the third strip electrodes and the fourth strip electrodes are disposed in an alternate manner.

A projection of the third strip electrodes or the fourth strip electrodes on the first substrate may be within a projection of the second electrode that is a slit electrode on the first substrate.

Widths of the third strip electrodes and the fourth strip electrodes may be respectively 2~2.5 μm; and a distance between a third strip electrode and a neighboring fourth strip electrode is 0.9~2.5 μm.

The third electrode and the fourth electrode may be insulated from each other via a second insulation layer disposed therebetween, the third electrode is disposed on the second substrate, the second insulation layer is disposed on the third electrode, the fourth electrode is disposed on the second insulation layer; the third electrode is a plate electrode, and the fourth electrode is a slit electrode.

The second electrode and the fourth electrode may be mirror symmetrical with respect the liquid crystal layer.

A colored resin layer is disposed on the first substrate, the colored resin layer is disposed between the first substrate and the first electrode; or a colored resin layer is disposed on the second substrate, the colored resin layer is disposed between the second substrate and the third electrode as well as the fourth electrode.

The LCD panel further comprises: a plurality of first switch transistors disposed on the first substrate, drain electrodes of the first switch transistors are respectively connected in one-to-one correspondence to first electrodes or second electrodes functioning as pixel electrodes; a plurality of first gate lines disposed on the first substrate and respectively connected to gate electrodes of first switch transistors in one row; a plurality of first data lines disposed on the first substrate and respectively connected to source electrodes of first switch transistors in one column; and a plurality of second switch transistors disposed on the second substrate, drain electrodes of the second switch transistors are respectively connected in one-to-one correspondence to third electrodes or fourth electrodes functioning as the pixel electrodes; a plurality of second gate lines disposed on the second substrate and respectively connected to gate electrodes of second switch transistors in one row; a plurality of second data lines disposed on the second substrate and respectively connected to source electrodes of second switch transistors in one column.

The first gate lines and the second gate lines may be connected to a same gate driver circuit, and the first data lines and the second data lines may be connected to a same source driver circuit.

An embodiment of the invention provides a method for driving a liquid crystal display panel, comprising: applying, at the same time, signal voltages to a first electrode or a second electrode functioning as a pixel electrode on a first substrate and a third electrode or a fourth electrode functioning as a pixel electrode on a second substrate, common voltages to the second electrode or the first electrode functioning as a common electrode on the first substrate and the fourth electrode or the third electrode functioning as a common electrode on the second substrate, to display an image.

Signal voltages of an equal value may be applied to the first electrode or the second electrode functioning as the pixel electrode on the first substrate and the third electrode or the fourth electrode functioning as the pixel electrode on the second substrate, and common voltages of an equal value may be applied to the second electrode or the first electrode functioning as the common electrode on the first substrate and the fourth electrode or the third electrode functioning as the common electrode on the second substrate, to display an image.

An embodiment of the invention provides a display device comprising the above LCD panel.

From the above, the LCD panel provided by embodiments of the invention comprises: a first substrate and a second substrate disposed opposite to each other and a liquid crystal layer positioned between the first substrate and the second substrate; a first electrode and a second electrode insulated from and on the first electrode are disposed on a side of the first substrate which is close to the liquid crystal layer; one of the first electrode and the second electrode is a common electrode, and the other is a pixel electrode; a third electrode and a fourth electrode are disposed on a side of the second substrate which is close to the liquid crystal layer, one of the third electrode and the fourth electrode is a common electrode, and the other is a pixel electrode. A multidimensional E-field is formed between the first and second electrodes on the first substrate; a multi-dimensional E-field or a transverse E-field is formed between the third and fourth electrodes on the second substrate. The multi-dimensional E-field formed between the first and second electrodes on the first substrate and the multi-dimensional E-field or the transverse E-field formed between the third and fourth electrodes on the second substrate act on the liquid crystal molecules between the first and second substrates. In the case where a driving voltage for rotating the liquid crystal molecules remains constant, the transmissivity is improved. In the case where the transmissivity remains the same, and the driving voltage for rotating the liquid crystal molecules is decreased. Thus the image display quality of the LCD panel can be improved.

DETAILED DESCRIPTION

Figure 1:
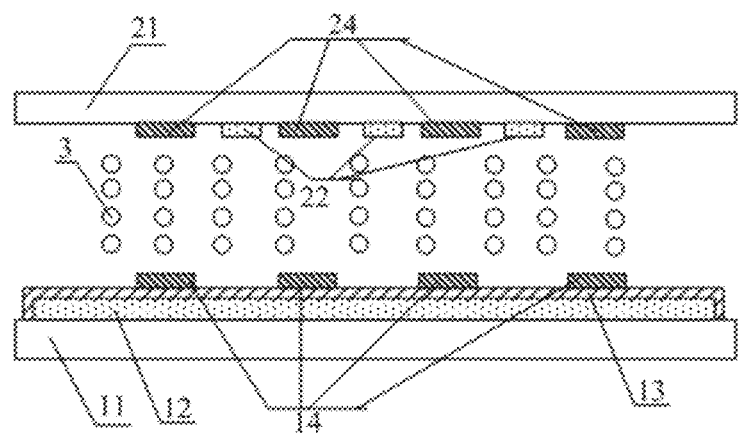
FIG. 1 schematically illustrates a configuration of an LCD panel in accordance with Embodiment 1 of the invention.

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Embodiments of the invention provide an LCD panel, a method for driving the same and a display device to improve the transmissivity and the image display quality of an LCD panel.

A liquid crystal display panel provided by an embodiment of the invention comprises at least a color filter substrate and an array substrate as well as a liquid crystal layer positioned between the color filter substrate and the array substrate. A first electrode and a second electrode are disposed on one of the array substrate and the color filter substrate; one of the first and second electrodes is a pixel electrode, and the other is a common electrode; an E-field is formed between the first and second electrodes in operation. A third electrode and a fourth electrode is disposed on the other of the array substrate and the color filter substrate; one of the third and fourth electrodes is a pixel electrode, and the other is a common electrode; an E-field is formed between the third and fourth electrodes in operation. A multi-dimensional E-field or a transverse E-field may be formed between the first and second electrodes; a multi-dimensional E-field or a transverse E-field may also be formed between the third and fourth electrodes. The multi-dimensional E-field or the transverse E-field formed between the first and second electrodes and the multi-dimensional E-field or the transverse E-field formed between the third and fourth electrode act on liquid crystal molecules between the color filter substrate and the array substrate; thus given that a driving voltage for rotating the liquid crystal molecules remains constant, the transmissivity is improved. Given that the transmissivity remains the same, the driving voltage for rotating the liquid crystal molecules is decreased. It can thus improve the image display quality of an LCD panel.

It is noted that the structures in technical solutions and drawing provided by the embodiments of the invention are used to illustrate instead of limiting the invention, and scales and sizes of individual films layers in the drawings are not drawn according to the real scales and sizes.

In the following, the LCD panel, the method for driving the same and the display device provided by the embodiments of the invention will be described in detail in connection with the drawings. Partial configurations of an LCD panel comprising only one sub-pixel will be described in all embodiments and drawings of the invention.

Embodiment 1

With reference to FIG. 1, an LCD panel comprises: a first substrate 11 and a second substrate 21 opposed to each other and assembled together to form a cell, as well as a liquid crystal layer 3 disposed between the first substrate 11 and the second substrate 21.

The LCD panel further comprises a first electrode 12 disposed on a side of the first substrate 11 which is close to the liquid crystal layer 3, a first insulation layer 13 disposed on the first electrode 12 and a second electrode 14 disposed on the first insulation layer 13.

One of the first electrode 12 and the second electrodes 14 is a pixel electrode, and the other is a common electrode.

The LCD panel further comprises a third electrode 22 and a fourth electrode 24 disposed on a side of the second substrate 21 which is close to the liquid crystal layer 3. One of the third electrode 22 and the fourth electrodes 24 is a pixel electrode, and the other is a common electrode.

The LCD panel provided by Embodiment 1 of the invention is illustrated only with the pixel electrode and the common electrode disposed on the first substrate and the second substrate in a sub-pixel region. A multi-dimensional E-field is formed between the first electrode and the second electrode; a multi-dimensional E-field or a transverse E-field is formed between the third electrode and the fourth electrode. The multi-dimensional E-field formed between the first electrode and the second electrode and the multi-dimensional E-field or the transverse E-field formed between the third electrode and the fourth electrode act on liquid crystal molecules in the liquid crystal layer at the same time, causing the liquid crystal molecules to rotate, thereby display of images is realized. In the case where a driving voltage for rotating the liquid crystal molecules remains constant, the transmissivity is improved. In the case where the transmissivity remains the same, the driving voltage for rotating the liquid crystal molecules is decreased. It can thereby improve the image display quality of an LCD panel.

One of the first electrode and the second electrode provided by Embodiment 1 is the pixel electrode, and the other is the common electrode. In an exemplary implementation, the pixel electrode is disposed in a position close to the liquid crystal layer but far away from the first electrode, and the common electrode is disposed in a position close to the first electrode but far away from the liquid crystal layer. That is, the pixel electrode is disposed over the common electrode, which means the first electrode in Embodiment 1 is the common electrode, and the second electrode is the pixel electrode.

When the first electrode is the common electrode and the second electrode is the pixel electrode, the second electrode is disposed over the first electrode. For example, the first electrode is a plate electrode and the second electrode is a slit electrode, so as to improve the transmissivity of the LCD panel and generate the multi-dimensional E-field of a better effect.

It is noted that both the first electrode and the second electrode can be slit electrodes.

Figure 2:
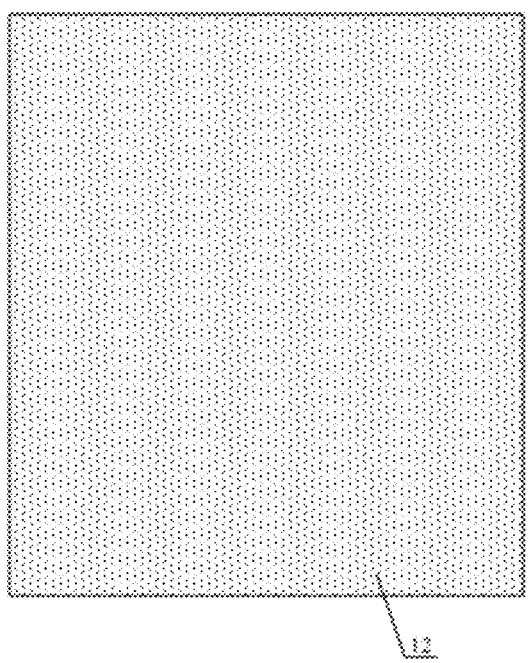
FIG. 2 schematically illustrates a configuration of a plate electrode in accordance with Embodiment 1 of the invention.
Figure 3:
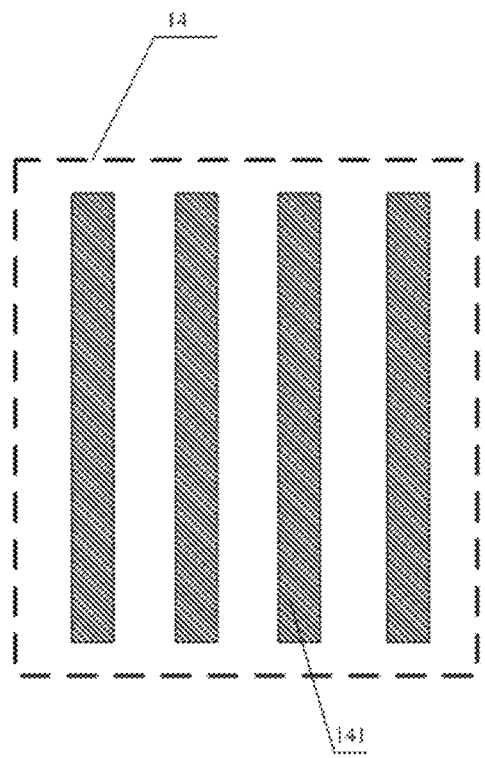
FIG. 3 schematically illustrates a first configuration of a slit electrode in accordance with Embodiment 1 of the invention.
Figure 4:
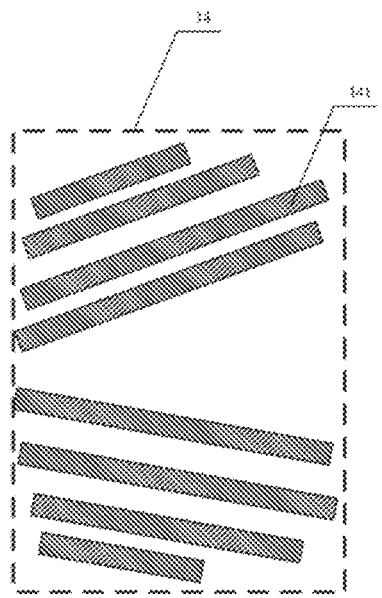
FIG. 4 schematically illustrates a second configuration of a slit electrode in accordance with Embodiment 1 of the invention.

The plate electrodes provided by all embodiments of the invention are planar electrodes without any pattern therein, such as the first plate electrode 12 of FIG. 2. The slit electrodes provided by all embodiments of the invention are electrodes having slits therein; the electrodes may comprise one or more sets of electrode elements, each set of electrode elements comprises a plurality of strip electrodes extending along a same direction, and the strip electrodes of different set of electrode elements extend along different directions. A second electrode 14 as illustrated in FIG. 3 comprises one set of electrode elements, and the electrode elements comprise a plurality of strip electrodes 141 extending along the same direction. A second electrode 14 as illustrated in FIG. 4 comprises two sets of electrode elements, and each set of electrode elements comprises a plurality of strip electrodes 141 extending along the same direction; pairs of strip electrodes of both sets of electrode elements are disposed symmetrically to each other with an included angle therebetween.

The strip electrodes in the slit electrode may be of straight line strip electrodes, such as a straight line of "|", or strip electrodes having an angle, such as an angle bracket "<".

The plurality of strip electrodes 141 as illustrated in FIG. 3 is straight line strip electrodes.

For example, in the LCD panel provided by Embodiment 1, the first or second electrode functioning as the pixel electrode is disposed opposed to the third or fourth electrode functioning as the pixel electrode. That is to say, the first or second electrode functioning as the pixel electrode and the third or fourth electrode functioning as the pixel electrode are both disposed in a display region of a sub-pixel, rather than one being disposed in the display region of the sub-pixel while the other being disposed in a non-display region of the sub-pixel. The purpose of such a configuration is to improve the strength of the E-field acting on the liquid crystal molecules in the display region of the sub-pixel, thereby improving the transmissivity.

In the following, the LCD panel provided by Embodiment 1 will be described in detail with reference to different exemplary implementations.

Embodiment 2

The LCD panel of the embodiment has a configuration similar to that of Embodiment 1. Base on the LCD pane provided in Embodiment 1, for example with reference to FIG. 1, the third electrode 22 and the fourth electrode 24 on the second substrate 21 are disposed in the same layer.

Figure 5:
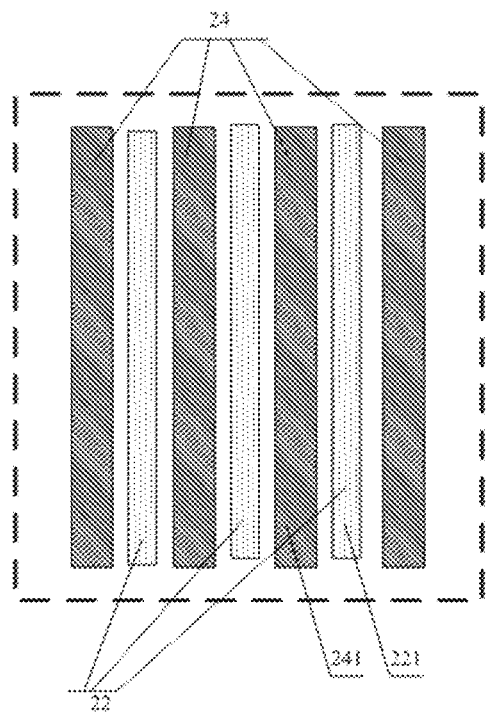
FIG. 5 schematically illustrates a configuration of a third and a fourth electrodes in accordance with Embodiment 1 of the invention.

A top view of the fourth electrode 24 and the third electrode 22 is provided in FIG. 5 for better illustrating the position relationship between the third electrode 22 and the fourth electrode 24 of FIG. 1.

With reference to FIGS. 1 and 5, the third electrode 22 comprises a plurality of third strip electrodes 221 arranged parallel to each other (that is, a plurality of third strip electrodes 221 extending along the same direction).

The fourth electrode 24 comprises a plurality of fourth strip electrodes 241 arranged parallel to each other (that is, a plurality of fourth strip electrodes 241 extending along the same direction). The third strip electrodes 221 and the fourth strip electrodes 241 are disposed in an alternate manner. A transverse E-field can be formed between the third strip electrodes 221 and the fourth strip electrodes 241.

The third strip electrodes 221 and the fourth strip electrodes 241 are not limited to straight line electrodes either, but may have other angled line-shaped electrode structures.

In the following, the principle of improving the transmissivity by the LCD panel provided by Embodiment 2 will be briefly described.

Figure 6:
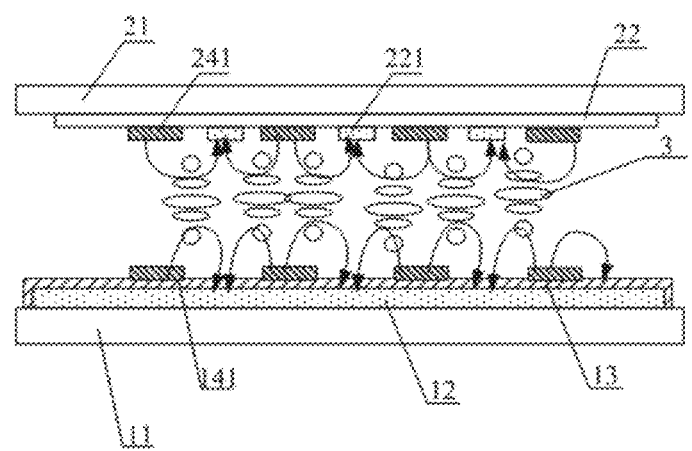
FIG. 6 is a diagram schematically illustrating an E-field distribution after powering on an LCD panel in accordance with Embodiment 2 of the invention.

With reference to FIG. 6, assumed that the first electrode 12 is the common electrode, the second electrode 14 is the pixel electrode, the third electrode 22 is the common electrode, and the fourth electrode 24 is the pixel electrode.

A signal voltage $V_{Data1}$ and a common voltage $V_{com1}$ are respectively applied to the second strip electrodes 141 of the second electrode 14 and the first electrode 12; and a signal voltage $V_{Data2}$ and a common voltage $V_{com2}$ are respectively applied to the fourth strip electrodes 241 of the fourth electrode 24 and the third strip electrodes 221 of the third electrode 22. A multi-dimensional E-field is formed between the second strip electrodes 141 and the first electrode 12, and a transverse E-field is formed between the third strip electrodes 221 and the fourth strip electrodes 241. The liquid crystal molecules are rotated under the collective action of the multi-dimensional E-field and the transverse E-field. In the case where a driving voltage for rotating the liquid crystal molecules remains constant, the transmissivity is improved. In the case where the transmissivity remains the same, the driving voltage for rotating the liquid crystal molecules is decreased. It can thereby improve the image display quality of the LCD panel.

Figure 7:
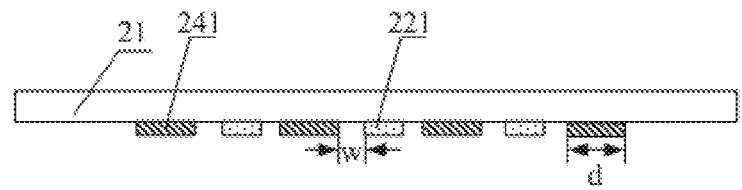
FIG. 7 is a diagram schematically illustrating widths of a third strip electrode and a fourth strip electrode as well as a distance therebetween in an LCD panel in accordance with Embodiment 2 of the invention.

When $V_{Data1}$ and $V_{com1}$ are of a certain value, the strength of the transverse E-field in the liquid crystal layer is at least doubled, the liquid crystal molecules are therefore rotated by a larger angle, and the transmissivity is accordingly larger. Illustrated in FIG. 7 is the E-field distribution between the first substrate 11 and the second substrate 21. When the transmissivity is of a certain value, the driving voltage V for rotating the liquid crystal molecules is decreased; the driving voltage $V_{op}$ is decreased upon the maximum transmissivity.

In implementations, the same signal voltages $V_{Data1}=V_{Data2}$ are applied to the second strip electrodes 141 and the fourth strip electrodes 241, the same common voltages $V_{com1}=V_{com2}$ are applied to the first electrode 12 and the third strip electrodes 221, which is helpful to improve the transmissivity and the decrease the driving voltage for rotating the liquid crystal molecules.

In the LCD panel provided by Embodiment 2, one of the third electrode and the fourth electrode is the pixel electrode and the other is the common electrode; the strip electrodes of the third or fourth electrode form a comb electrode, facilitating the application of voltages to respective strip electrodes. "The strip electrodes in the third or fourth electrode" in all embodiments refers to the third strip electrodes of the third electrode or the fourth electrodes of the fourth electrode.

It is noted that the configuration of the electrodes on the first substrate of Embodiment 1 is also applicable to Embodiment 2, which will not be repeated here.

As an example, in Embodiment 2, a projection of the strip electrodes of the third or fourth electrode on the first substrate is within a projection of the second electrode on the first substrate. In other word, the projection of the third electrode or the fourth electrode on the first substrate is within the projection of the second electrode on the first substrate, and there is also the implementation of the projection of the third electrode or the fourth electrode on the first substrate overlapping the projection of the second electrode on the first substrate. An objective of such a configuration is to further improve the strength of the E-field acting on the liquid crystal molecules in the display region of the sub-pixel, thereby improving the transmissivity.

As an example, the widths of the third strip electrodes and the fourth strip electrodes are respectively 2~2.5 μm;

The distance between a third strip electrode and a neighboring fourth strip electrode is 0.9~2.5 μm. With reference to FIG. 7, the distance w between a third strip electrode 221 of the third electrode 22 and a neighboring fourth strip electrode 241 of the fourth electrode 24 on the second substrate 21 is 0.9~2.5 μm; and the widths d of the third strip electrodes 221 and the fourth strip electrodes 241 are respectively 2~2.6 μm. The widths of individual strip electrodes and the distance therebetween can be determined according to the size and the resolution of an LCD panel in implementations, which will not be limited here.

Embodiment 3

Figure 8:
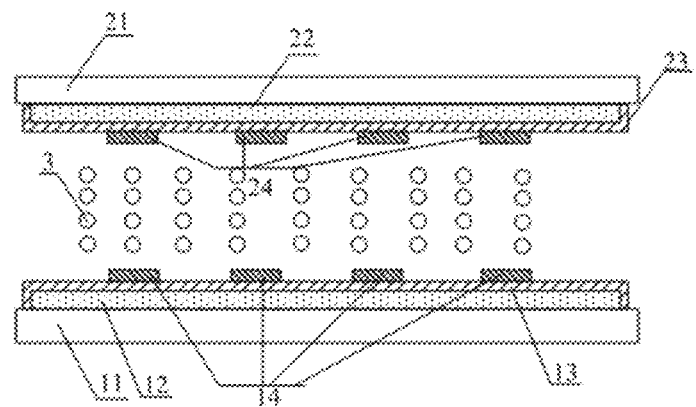
FIG. 8 schematically illustrates a configuration of an LCD panel in accordance with Embodiment 3 of the invention.

The LCD panel of the present embodiment has a configuration similar to that of Embodiment 1. Additionally, with reference to an example of FIG. 8, on the basis of the LCD panel provided in Embodiment 1, the third electrode 22 and the fourth electrode 24 on the second substrate 21 are disposed in different layers. As illustrated in FIG. 8, the third electrode 22 and the fourth electrode 24 are insulated from each other via a second insulation layer 23.

The third electrode 22 is disposed on a side of the second substrate 21 which is close to the liquid crystal layer 3, the second insulation layer 23 is disposed on the third electrode 22, the fourth electrode 24 is disposed on the second insulation layer 23. That is, the third electrode 22 is far away from the liquid crystal layer 3, and the fourth electrode is close to the liquid crystal layer 3.

In the LCD panel of Embodiment 3, one of the third and fourth electrodes is the pixel electrode and the other is the common electrode. A multi-dimensional E-field is formed between the third and fourth electrodes.

A multi-dimensional E-field is also formed between the first and second electrodes. The multi-dimensional E-field formed between the first electrode and the second electrode and the multi-dimensional E-field formed between the third electrode and fourth electrodes act on the liquid crystal molecules collectively, causing the liquid crystal molecules to rotate, thereby image display is realized. In the case where a driving voltage for rotating the liquid crystal molecules remains constant, the transmissivity is improved. In the case where the transmissivity remains the same, the driving voltage for rotating the liquid crystal molecules is decreased. Thus the image display quality of the LCD panel can be improved.

As an example, like the first and second electrodes on the first substrate of Embodiment 1, the third electrode is a plate electrode, and the fourth electrode is a slit electrode.

It should be noted that both the third electrode and fourth electrode may be slit electrodes.

As an example, the second electrode that is a slit electrode on the first substrate and the fourth electrode that is a slit electrode on the second substrate are in a mirror symmetry with respect to the liquid crystal layer. That is, the second electrode and the fourth electrode have the same structure and are exactly opposite to each other, and the projections of both electrodes on the first electrode overlap with each other. An objective of such a configuration is to further improve the strength of the E-field acting on the liquid crystal molecules in the display region of the sub-pixel, thereby improving transmissivity.

It should be noted that one of the first and second substrates as provided by Embodiments 1 to 3 is a base substrate of the array substrate of the LCD panel and the other is a base substrate of the color filter substrate. Accordingly, the first substrate together with the film layers thereon form the array substrate (or the color filter substrate), the second substrate together with the film layers thereon form the color filter substrate (or the array substrate).

Embodiment 4

The LCD panels provided by Embodiments 1 to 3 further comprise a colored resin layer respectively. Embodiment 2 will be described as an example.

Figure 9:
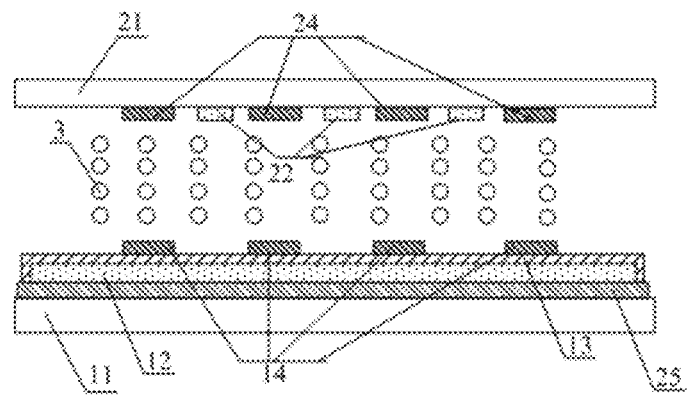
FIG. 9 schematically illustrates a first configuration of an LCD panel in accordance with Embodiment 4 of the invention.

With reference to FIG. 9, the LCD panel of the embodiment has a configuration similar to that as illustrated in FIG. 1, with the difference in that the LCD panel further comprises a colored resin layer 25.

The colored resin layer 25 is disposed on the first substrate 11, specifically, between the first substrate 11 and the first electrode 12. In this case, the first substrate 11 having the colored resin layer 25 and the functional film layers disposed thereon form a color filter substrate. The second substrate 21 and the functional film layers disposed thereon form an array substrate.

Figure 10:
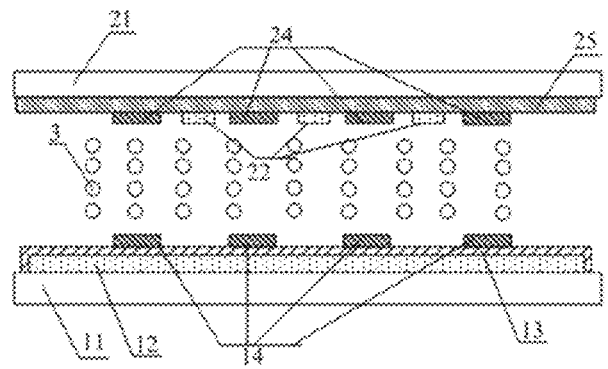
FIG. 10 schematically illustrates a second configuration of an LCD panel in accordance with Embodiment 4 of the invention.

With reference to FIG. 10, the LCD panel has a configuration similar to that of FIG. 1, with the difference in that a colored resin layer 25 is disposed on the second substrate 21, specifically, between the third electrode 22 and the second substrate 21 as well as between the fourth electrode 24 and the second substrate 21. In this case, the second substrate 21 having the colored resin layer 25 and the functional film layers disposed thereon form a color filter substrate. The first substrate 11 and the functional film layers disposed thereon form an array substrate.

The provision of the colored resin layer in the LCD panel provided by Embodiment 3 is similar to that of embodiment 2. The colored resin layer is disposed on the second substrate, specifically, between the third electrode and the second substrate as well as between the fourth electrode and the second substrate. Or, the colored resin layer is disposed on the first substrate, specifically, between the first electrode and the first substrate as well as between the second electrode and the first substrate.

The first substrate of the LCD panel may further comprise a plurality of first switch transistors disposed on the first substrate and corresponding to respective sub-pixel, and, the drain electrode of each first switch transistor is connected to the corresponding first electrode or the corresponding second electrode functioning as the pixel electrode; and further comprise a plurality of first gate lines disposed on the first substrate and each connected to the gate electrodes of first switch transistors in one row, and a plurality of first data lines disposed on the first substrate and each connected to the source electrodes of first switch transistors in each column.

It is defined that each switch transistor and the corresponding pixel electrode form a pixel.

The first gate lines consecutively scan all the rows of pixels, the first data lines consecutively scan all the columns of pixels, causing the pixels on the first substrate to control the transmittance of light under the control of the first gate lines and the first data lines, thereby displaying images.

The second substrate of the LCD panel further comprises: a plurality of second switch transistors disposed on the second substrate, the drain electrodes of each second switch transistor is connected to the corresponding third electrode or the corresponding fourth electrode functioning as the pixel electrode; and the second substrate further comprises a plurality of second gate lines disposed on the second substrate and each connected to the gate electrodes of second switch transistors in one row, and a plurality of second data lines disposed on the second substrate and each connected to the source electrodes of second switch transistors in one column.

It is defined that each switch transistor and the corresponding pixel electrode form a pixel.

The second gate lines consecutively scan all the rows of pixels, and the second data lines consecutively scan all the columns of pixels, causing the pixels on the second substrate to control the transmittance of light under the control of the second gate lines and the second data lines, thereby displaying images.

In implementations, the first gate line and the second gate lines may be connected to the same gate driver circuit, the first electrode or second electrode functioning as the common electrode and the third electrode or the fourth electrode functioning as the common electrode are connected to a power source directly or via a common electrode line, such as connected to a same DC voltage source. The first data lines and the second data lines are connected to the same source driver circuit; the DC voltage source applies a constant voltage to the common electrode on the first substrate and the common electrode on the second substrate. Under the control of a timing controller, the gate driver circuit and the source driver circuit drive the pixel array on the first substrate and the pixel array on the second substrate at the same time, thereby displaying images. The pixel arrays comprise the pixel electrodes and the switch transistors.

As an example, the first, second, third and fourth electrodes are a transparent metal oxide film layers, such as indium tin oxides (ITO) or indium zinc oxides (IZO) and the like.

The colored resin layer illustrated in the drawings of the invention are used to describe its position relative to the first, second, third and fourth electrodes only, and does not intend to limit specific structure of the colored resin layer. In implementations, the configuration of the colored resin layer may be similar to the conventional configuration, which will not be elaborated here.

It should be noted that the LCD panel provided by the embodiments of the invention further comprises a first polarizer disposed on a side of the first substrate which is far away from the liquid crystal layer; and a second polarizer disposed on a side of the second substrate which is far away from the liquid crystal layer. Polarization directions of the polarizers are different according to different driving methods, and may be decided according to practical requirements, which will not be elaborated here.

The LCD panel provided by the embodiments of the invention further comprises: a first alignment layer disposed on the first substrate; and a second alignment layer disposed on the second substrate. The first and second alignment layers are configured for aligning the liquid crystal molecules in the liquid crystal layer, with the specific configuration similar to that of the conventional art, which will not be elaborated here.

An embodiment of the invention further provides a method for driving the above LCD panel, comprising: applying, at the same time, signal voltages to a first electrode or a second electrode functioning as a pixel electrode on a first substrate and a third electrode or a fourth electrode functioning as a pixel electrode on a second substrate, and common voltages to a second electrode or a first electrode functioning as a common electrode on the first substrate and a fourth electrode or a third electrode functioning as a common electrode on the second substrate, to display an image.

Signal voltages of an equal value may be applied to the first electrode or the second electrode functioning as the pixel electrode on the first substrate and to the third electrode or the fourth electrode functioning as the pixel electrode on the second substrate; common voltages of an equal value may be applied to the second electrode or the first electrode functioning as the common electrode on the first substrate and to the fourth electrode or the third electrode functioning as the common electrode on the second substrate, to display an image.

Figure 11:
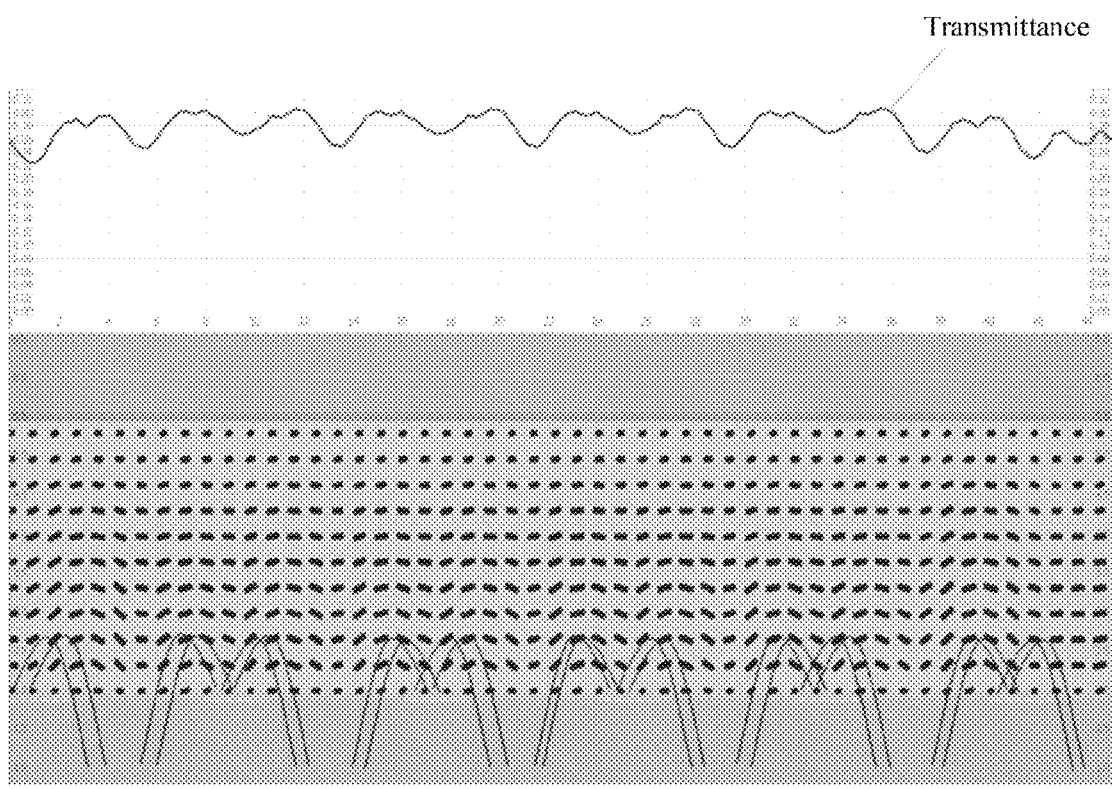
FIG. 11 is a diagram illustrating transmissivity simulation for a conventional LCD panel displaying images.
Figure 12:
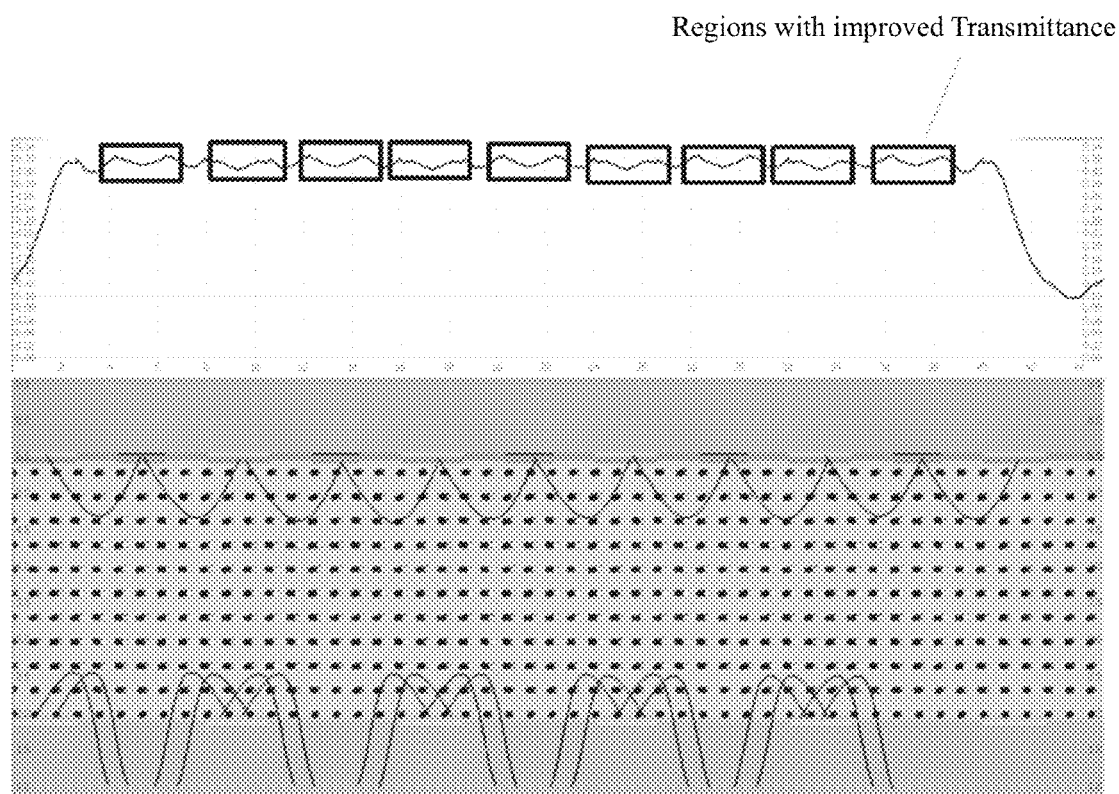
FIG. 12 is a diagram illustrating transmissivity simulation for the LCD panel of Embodiment 2 of the invention displaying images.
Figure 13:
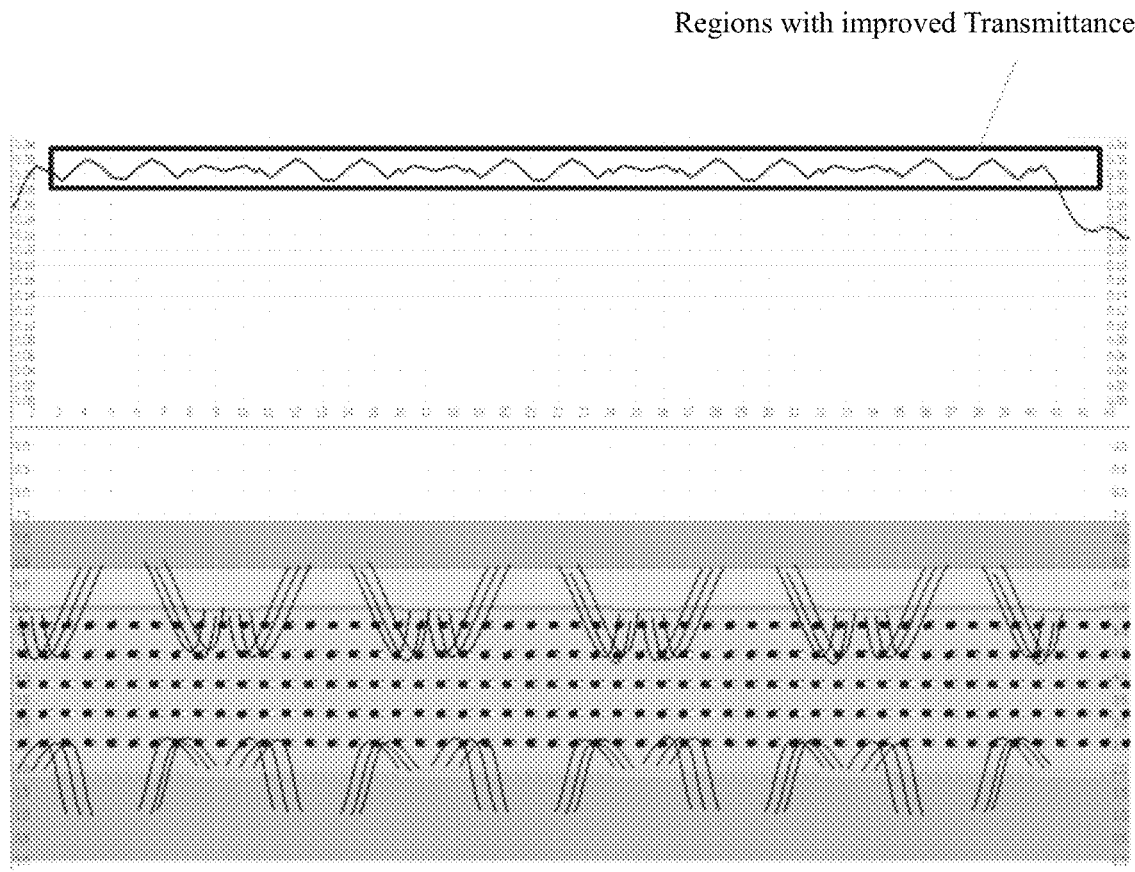
FIG. 13 is a diagram illustrating transmissivity simulation for the LCD panel of Embodiment 3 of the invention displaying images.

With reference to FIGS. 11, 12 and 13, from the comparison of the transmissivity simulation diagrams (respectively corresponding to FIGS. 12 and 13) of the LCD panels provided by Embodiments 2 and 3 with the transmissivity simulation diagram (FIG. 11) of the conventional LCD panel, it can be seen that the transmissivity of the display regions of each sub-pixel regions of the whole LCD panels provided by Embodiments 2 and 3 is almost consistent and the transmissivity is higher, compared with the conventional art.

An embodiment of the invention further provides a display device, comprising the LCD panel. The display device may be an LCD panel, an LCD, or a liquid crystal televisions and the like.

From the above, the LCD panel provided by the invention comprises: a first substrate and a second substrate disposed opposite to each other and a liquid crystal layer positioned between the first substrate and the second substrate. A first electrode and a second electrode insulated from and on the first electrode are disposed on a side of the first substrate which is close to the liquid crystal layer. One of the first electrode and the second electrode is a common electrode, the other is a pixel electrode. A third electrode and a fourth electrode are disposed on a side of the second substrate which is close to the liquid crystal layer, one of the third electrode and the fourth electrode is a common electrode, and the other is a pixel electrode. A multidimensional E-field is formed between the first and second electrodes on the first substrate; and a multi-dimensional E-field or a transverse E-field is formed between the third and fourth electrodes on the second substrate. The multi-dimensional E-field formed between the first and second electrodes and the multi-dimensional E-field or the transverse E-field formed between the third and fourth electrode act on the liquid crystal molecules between the first substrate and the second substrate. In the case where a driving voltage for rotating the liquid crystal molecules remains constant, the transmissivity is improved. In the case where the transmissivity remains the same, the driving voltage for rotating the liquid crystal molecules is decreased. Thus the image display quality of the LCD panel can be improved.

Those skilled in the art can make various modifications and variants to the invention without departing from the spirit and scopes of the invention. Therefore, the invention intends to comprise the modifications and variants when the modifications and variants fall into the scope of the claims and that of the equivalent technologies.

The invention claimed is:

1. A liquid crystal display panel, comprising a first substrate and a second substrate disposed opposite to each other, and a liquid crystal layer positioned between the first substrate and the second substrate, wherein:
    a first electrode and a second electrode insulated from and disposed on the first electrode are disposed on a side of the first substrate which is close to the liquid crystal layer; one of the first electrode and the second electrode is a common electrode, the other is a pixel electrode;
    a third electrode and a fourth electrode are disposed on a side of the second substrate which is close to the liquid crystal layer, one of the third electrode and the fourth electrode is a common electrode, the other is a pixel electrode; and
    the liquid crystal display panel further comprises:
        a plurality of first switch transistors disposed on the first substrate, drain electrodes of the first switch transistors are respectively connected in one-to-one correspondence to first electrodes or second electrodes functioning as pixel electrodes;
        a plurality of first gate lines disposed on the first substrate and respectively connected to gate electrodes of first switch transistors in one row;
        a plurality of first data lines disposed on the first substrate and respectively connected to source electrodes of first switch transistors in one column;
        a plurality of second switch transistors disposed on the second substrate, drain electrodes of the second transistors are respectively connected in one-to-one correspondence to third electrodes or fourth electrodes functioning as a pixel electrodes;
        a plurality of second gate lines disposed on the second substrate and respectively connected to gate electrodes of second switch transistors in one row; and
        a plurality of second data lines disposed on the second substrate and respectively connected to source electrodes of second switch transistors in one column.

2. The liquid crystal display panel of claim 1, wherein the first electrode and the second electrode are insulated from each other via a first insulation layer disposed therebetween; the first electrode is a plate electrode, and the second electrode is a slit electrode.

3. The liquid crystal display panel of claim 2, wherein the third electrode and the fourth electrode are disposed in a same layer, the third electrode comprises a plurality of third strip electrodes extending along a first direction, the fourth electrode comprises a plurality of fourth strip electrodes extending along the first direction, and the third strip electrodes and the fourth strip electrodes are disposed in an alternate manner.

4. The liquid crystal display panel of claim 3, wherein a projection of the third strip electrodes or the fourth strip electrodes on the first substrate is within a projection of the second electrode that is a slit electrode on the first substrate.

5. The liquid crystal display panel of claim 3, wherein widths of the third strip electrodes and the fourth strip electrodes are respectively 2~2.5 µm;

a distance between a third strip electrode and a neighboring fourth strip electrode is 0.9~2.5 µm.

6. The liquid crystal display panel of claim 2, wherein the third electrode and the fourth electrode are insulated from each other via a second insulation layer disposed therebetween, the third electrode is disposed on the second substrate, the second insulation layer is disposed on the third electrode, the fourth electrode is disposed on the second insulation layer;

the third electrode is a plate electrode, and the fourth electrode is a slit electrode.

7. The liquid crystal display panel of claim 6, wherein the second electrode and the fourth electrode are mirror symmetrical with respect to the liquid crystal layer.

8. The liquid crystal display panel of claim 1, wherein the third electrode and the fourth electrode are disposed in a same layer, the third electrode comprises a plurality of third strip electrodes extending along a first direction, the fourth electrode comprises a plurality of fourth strip electrodes extending along the first direction, and the third strip electrodes and the fourth strip electrodes are disposed in an alternate manner.

9. The liquid crystal display panel of claim 8, wherein a projection of the third strip electrodes or the fourth strip electrodes on the first substrate is within a projection of the second electrode that is a slit electrode on the first substrate.

10. The liquid crystal display panel of claim 8, wherein widths of the third strip electrodes and the fourth strip electrodes are respectively 2~2.5 µm;

a distance between a third strip electrode and a neighboring fourth strip electrode is 0.9~2.5 µm.

11. The liquid crystal display panel of claim 1, wherein the third electrode and the fourth electrode are insulated from each other via a second insulation layer disposed therebetween, the third electrode is disposed on the second substrate, the second insulation layer is disposed on the third electrode, the fourth electrode is disposed on the second insulation layer;

the third electrode is a plate electrode, and the fourth electrode is a slit electrode.

12. The liquid crystal display panel of claim 11, wherein the second electrode and the fourth electrode are mirror symmetrical with respect to the liquid crystal layer.

13. The liquid crystal display panel of claim 1, wherein a colored resin layer is disposed on the first substrate, and the colored resin layer is disposed between the first substrate and the first electrode; or a colored resin layer is disposed on the second substrate, and the colored resin layer is disposed between the second substrate and the third electrode as well as the fourth electrode.

14. The liquid crystal display panel of claim 1, wherein the first gate lines and the second gate lines are connected to a same gate driver circuit, and the first data lines and the second data lines are connected to a same source driver circuit.

15. A method for driving the liquid crystal display panel of claim 1, comprising: applying, at the same time, signal voltages to a first electrode or a second electrode functioning as a pixel electrode on a first substrate and a third electrode or a fourth electrode functioning as a pixel electrode on a second substrate, and common voltages to the second electrode or the first electrode functioning as a common electrode on the first substrate and the fourth electrode or the third electrode functioning as a common electrode on the second substrate, to display an image.

16. The method of claim 15, wherein signal voltages of an equal value are applied to the first electrode or the second electrode functioning as the pixel electrode on the first substrate and the third electrode or the fourth electrode functioning as the pixel electrode on the second substrate, and common voltages of an equal value are applied to the second electrode or the first electrode functioning as the common electrode on the first substrate and the fourth electrode or the third electrode functioning as the common electrode on the second substrate, to display an image.

17. A display device comprising the liquid crystal display panel of claim 1.

* * * * *